United States Patent
Gedde

(10) Patent No.: US 9,261,903 B1
(45) Date of Patent: Feb. 16, 2016

(54) RETRACTABLE MONITOR COMPUTER ASSEMBLY

(71) Applicant: Yemane Gedde, Lathrop, CA (US)

(72) Inventor: Yemane Gedde, Lathrop, CA (US)

( * ) Notice: Subject to any disclaimer, the term of this patent is extended or adjusted under 35 U.S.C. 154(b) by 245 days.

(21) Appl. No.: 14/020,097

(22) Filed: Sep. 6, 2013

(51) Int. Cl.
| | |
|---|---|
| G06F 1/16 | (2006.01) |
| G09F 11/02 | (2006.01) |
| G09F 9/30 | (2006.01) |
| G09F 11/08 | (2006.01) |
| G09F 11/21 | (2006.01) |
| H05K 5/00 | (2006.01) |
| H05K 7/00 | (2006.01) |
| G03B 21/56 | (2006.01) |
| G02F 1/1333 | (2006.01) |

(52) U.S. Cl.
CPC ............ *G06F 1/1601* (2013.01); *G06F 1/1605* (2013.01); *G06F 1/1607* (2013.01); *G06F 1/1616* (2013.01); *G06F 1/1652* (2013.01); *G09F 9/301* (2013.01); *G09F 11/02* (2013.01); *G09F 11/08* (2013.01); *G09F 11/21* (2013.01)

(58) Field of Classification Search
CPC ... G06F 1/1601; G06F 1/1607; G06F 1/1616; G06F 1/1652; G09F 9/301; G09F 11/02; G09F 11/08; G09F 11/21
USPC ........... 361/679.21, 679.26, 679.27; 359/443, 359/450, 451, 454, 461; 345/30, 108, 205, 345/905; 349/58; 348/333.06, 333.07, 375; 40/493; 248/917, 918, 919, 920, 924
See application file for complete search history.

(56) References Cited

U.S. PATENT DOCUMENTS

| | | | |
|---|---|---|---|
| D342,521 S | 12/1993 | Sugihara et al. | |
| 7,911,445 B2 | 3/2011 | Gettemy et al. | |
| 7,952,801 B2 | 5/2011 | Yuzawa | |
| 8,031,400 B2 | 10/2011 | Wang et al. | |
| 2008/0144265 A1* | 6/2008 | Aoki | 361/681 |
| 2009/0273539 A1 | 11/2009 | Pruett | |
| 2010/0045569 A1* | 2/2010 | Estevez et al. | 345/3.1 |
| 2010/0115541 A1 | 5/2010 | Schein et al. | |

* cited by examiner

*Primary Examiner* — Hoa C Nguyen
*Assistant Examiner* — Binh Tran

(57) ABSTRACT

A retractable monitor computer assembly provides an adjustable viewable area that is also retractable into a lowered position when not in use. The assembly includes a housing having a bottom configured for supporting the housing on a surface. A processor is coupled to and positioned in the housing. Each of a pair of rollers is positioned in parallel spaced alignment. An upper arm is coupled to and extends between upper ends of the spaced rollers. A lower arm is coupled to and extends between lower ends of the spaced rollers. Each of the upper arm and the lower arm is telescopic wherein a distance between the rollers is adjustable. A monitor screen is operationally coupled to the processor and has opposed lateral sides coupled to the rollers. The monitor screen is flexible to be rolled onto the rollers to adjust a size of the monitor screen.

9 Claims, 5 Drawing Sheets

RETRACTABLE MONITOR COMPUTER ASSEMBLY

BACKGROUND OF THE DISCLOSURE

Field of the Disclosure

The disclosure relates to computer devices and more particularly pertains to a new computer device for providing an adjustable viewable area that is also retractable into a lowered position when not in use.

SUMMARY OF THE DISCLOSURE

An embodiment of the disclosure meets the needs presented above by generally comprising a housing having a bottom configured for supporting the housing on a surface. A processor is coupled to and positioned in the housing. Each of a pair of rollers is positioned in parallel spaced alignment. An upper arm is coupled to and extends between upper ends of the spaced rollers. A lower arm is coupled to and extends between lower ends of the spaced rollers. Each of the upper arm and the lower arm is telescopic wherein a distance between the rollers is adjustable. A monitor screen is operationally coupled to the processor. The monitor screen has opposed lateral sides coupled to the rollers. The monitor screen is flexible wherein the monitor screen is rolled onto the rollers when the upper arm and the lower arm are each in a fully retracted position. The monitor screen is in a planar position when the upper arm and the lower arm are each in a fully extended position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
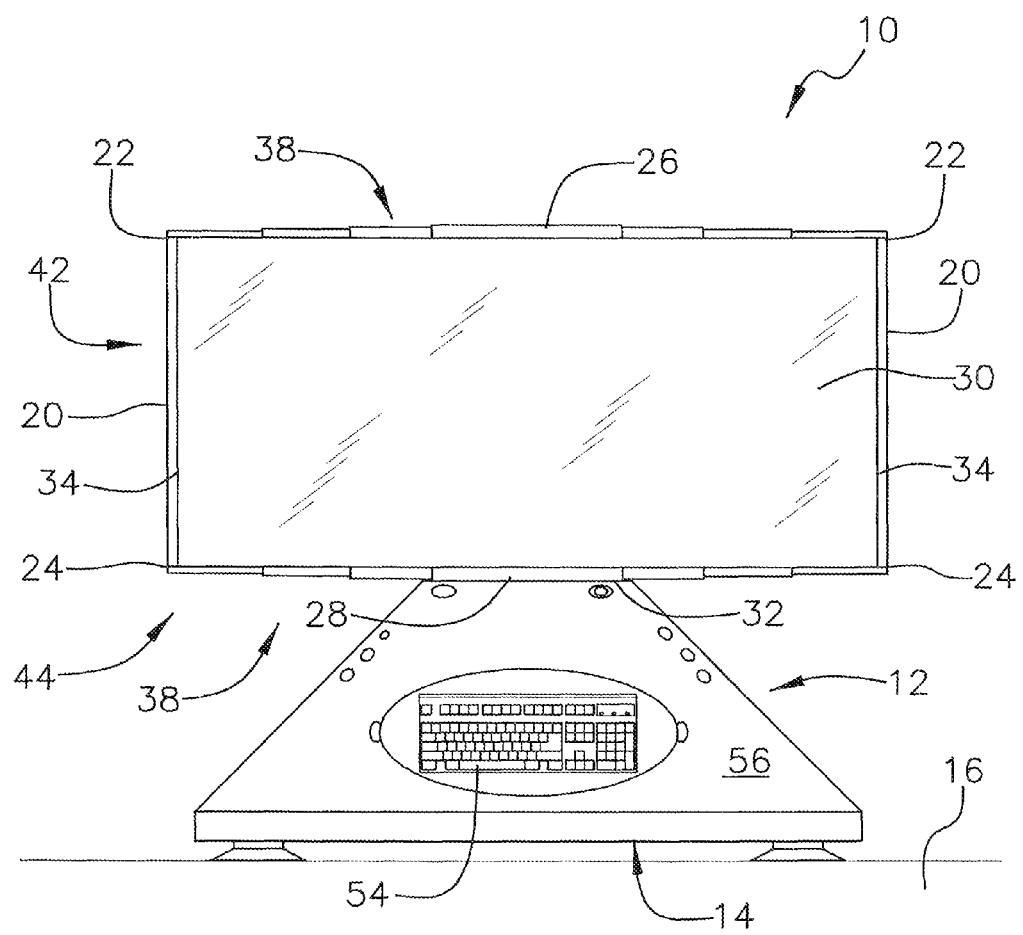
FIG. 1 is a front view of a retractable monitor computer assembly according to an embodiment of the disclosure.
Figure 2:
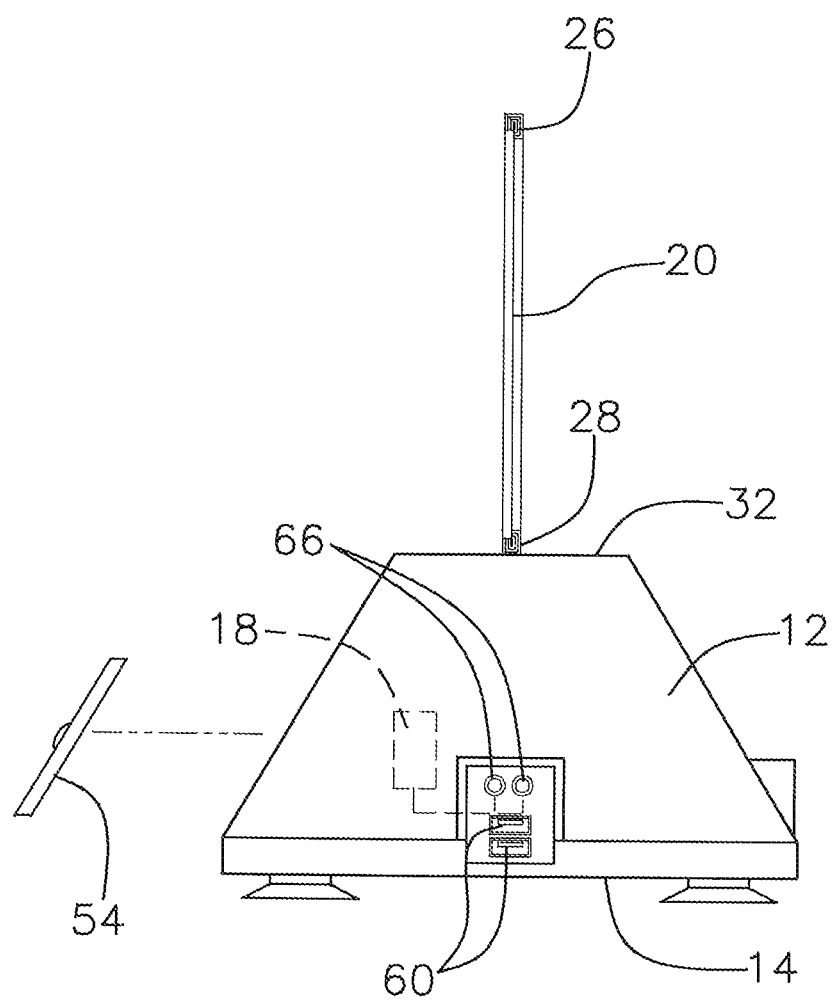
FIG. 2 is a side view of an embodiment of the disclosure.
Figure 3:
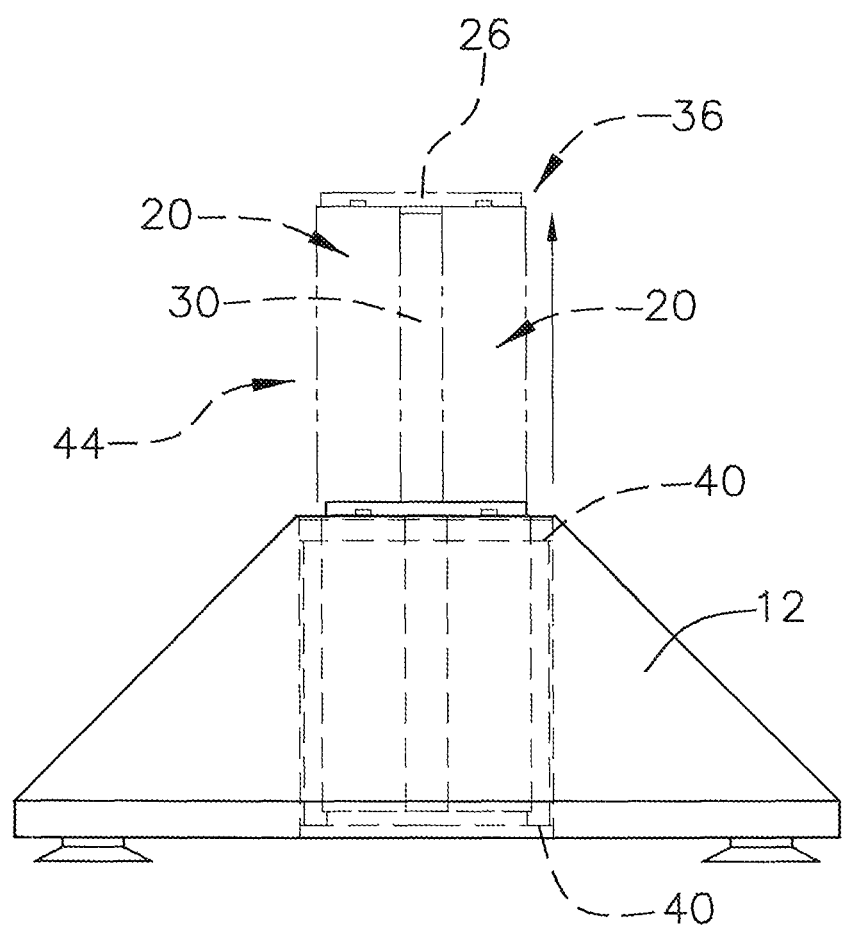
FIG. 3 is a front view of an embodiment of the disclosure.
Figure 4:
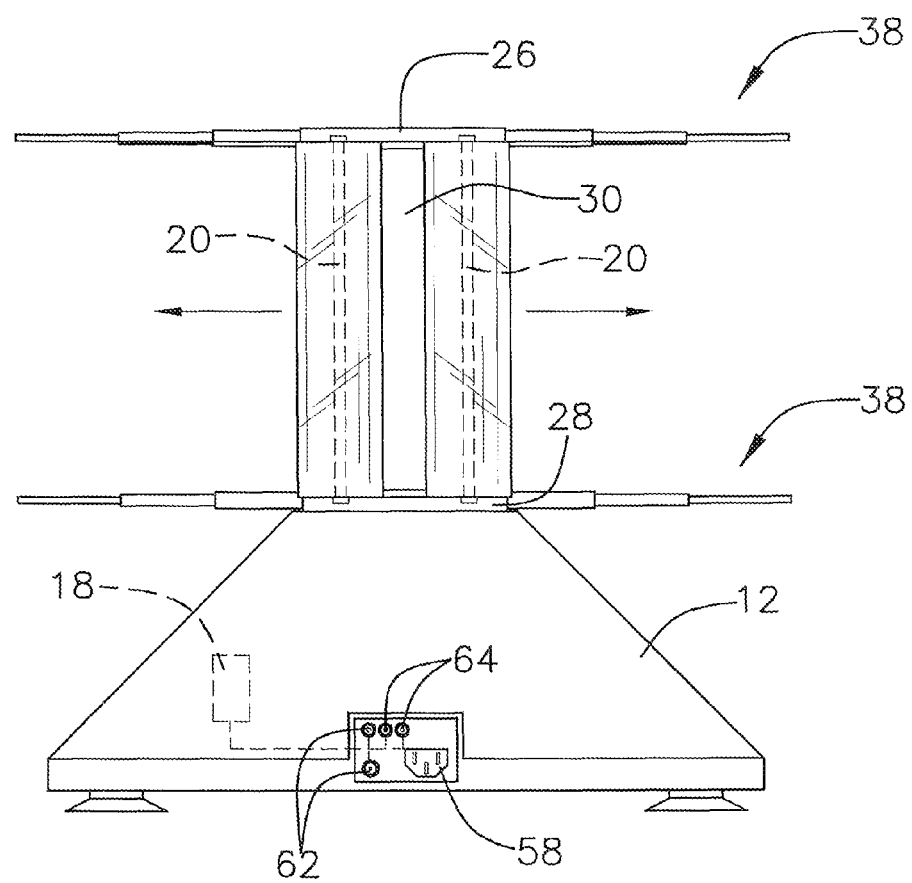
FIG. 4 is a back view of an embodiment of the disclosure.
Figure 5:
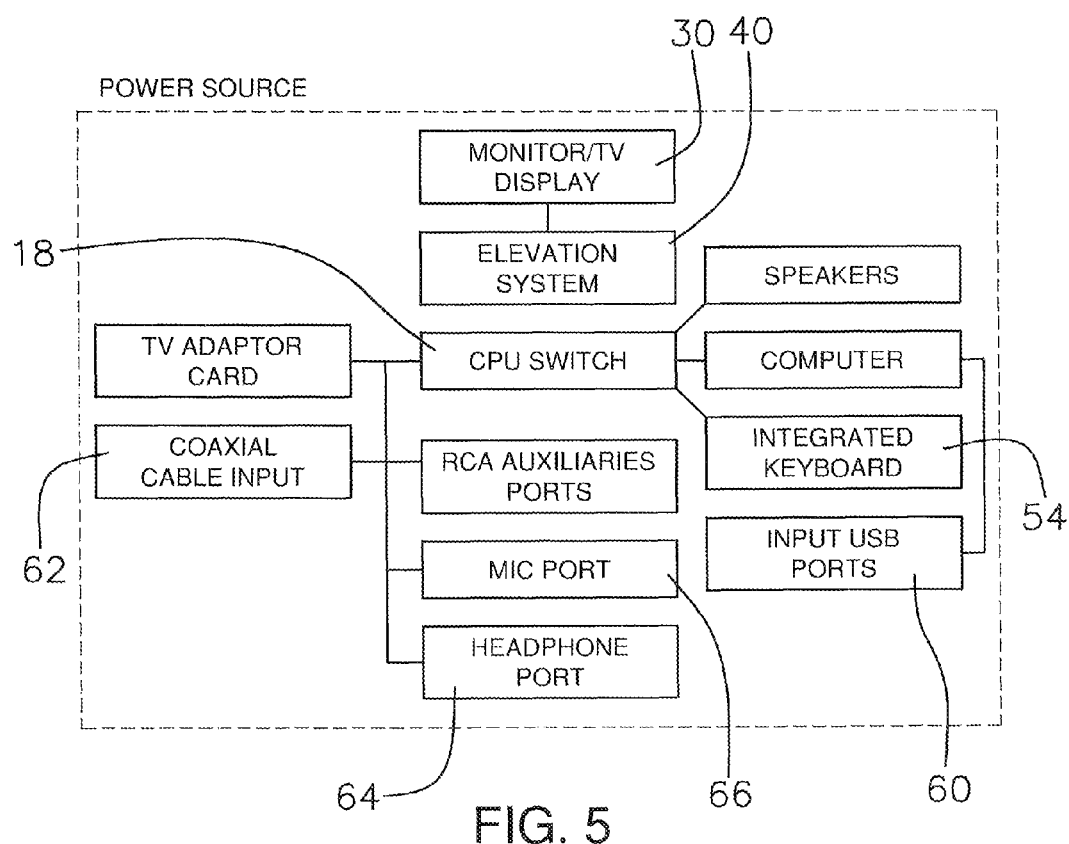
FIG. 5 is a schematic view of an embodiment of the disclosure.

With reference now to the drawings, and in particular to FIGS. 1 through 5 thereof, a new computer device embodying the principles and concepts of an embodiment of the disclosure and generally designated by the reference numeral 10 will be described.

As best illustrated in FIGS. 1 through 5, the retractable monitor computer assembly 10 generally comprises a housing 12 having a bottom 14 configured for supporting the housing 12 on a surface 16. A processor 18 is coupled to and positioned in the housing 12. Each of a pair of rollers 20 is positioned in parallel spaced alignment. Each roller 20 has an upper end 22 and a lower end 24. An upper arm 26 is coupled to and extends between the upper ends 22 of the spaced rollers 20. Similarly, a lower arm 28 is coupled to and extends between the lower ends 24 of the spaced rollers 20. Each of the upper arm 26 and the lower arm 28 is telescopic wherein a distance between the rollers 20 is adjustable. The telescopic movement to space the rollers 20 may be provided through direct manipulation or through a conventional mechanical construction controlled through the processor 18. The housing 12 has a substantially trapezoidal cross-sectional shape transverse to the lower arm 28. The housing 12 may further have a substantially trapezoidal cross-sectional shape parallel to the lower arm 28 wherein the bottom 14 of the housing 12 has a greater area than a top 32 of the housing 12.

A monitor screen 30 is operationally coupled to the processor 18. The monitor screen 30 has opposed lateral sides 34. Each opposed lateral side 34 is coupled to an associated one of the rollers 20. The monitor screen 30 is flexible wherein the monitor screen 30 is rolled onto the rollers 20 when the upper arm 26 and the lower arm 28 are each in a fully retracted position 36. The lower arm 28 and the upper arm 26 may be substantially centered over the housing 12 when in the fully retracted position 36. Telescopic movement of the upper arm 26 and lower arm 28 may also be coordinated in a conventional manner to maintain centering of the monitor screen 30 over the housing 12 while the rollers 20 are moved. The monitor screen 30 may also be anchored to a center of one or both of the upper arm 26 and the lower arm 28 to maintain centering of the monitor screen 30 over the housing when the rollers 20 are in a partially separated position. The processor 18 may control sizing of an image displayed on the monitor screen 30 to provide optimal viewing corresponding to the amount of the monitor screen 30 visible between the rollers 20. The monitor screen 30 may be in a planar position when the upper arm 26 and the lower arm 28 are each in a fully extended position 38. The monitor screen 30 is substantially centered over the housing 12 when the upper arm 26 and the lower arm 28 are in the fully extended position 38.

A support 40 is coupled to and positioned in the housing 12. The upper arm 26, the lower arm 28, the rollers 20, and the monitor screen 30 define a screen assembly 42. The screen assembly 42 is coupled to the support 40. The support 40 may be adjustable between a raised position 44 and a lowered position 46 wherein the screen assembly 42 is selectively extendable from and retractable into the housing 12 while the upper arm 26 and the lower arm 28 are each in the fully retracted position 36, in the fully extended position 38, the rollers 20 and thus, the opposed lateral sides 34 of the monitor screen 30 are positioned extending outwardly from the housing 12.

A key panel 54 may be coupled to and positioned on a front face 56 of the housing 12. The key panel 54 is operationally coupled to the processor 18 for inputting data and controlling functions of the processor 18 in the manner of a conventional computer. The key panel 54 may be removable from the housing 12 or integrally coupled to the housing 12. A power port 58 is coupled to the housing 12 and electrically coupled to the processor 18 and the monitor screen 30. The power port 58 may be utilized with a conventional power cord coupled to an appropriate power source. A communication port 60 may also be coupled to the housing 12 and communicatively coupled to the processor 18. The communication port 60 may be in the form of a coaxial cable connector, HDMI connector, or the like. A video output port 62 may be coupled to the housing 12 and communicatively coupled to the processor 18 for outputting a video signal through the video output port 62 to an auxiliary video monitoring source either alternative to and in combination with the monitor screen 30. An audio output port 64 may be coupled to the housing 12 and communicatively coupled to the processor 18 for outputting an audio signal through the audio output port 64 to an extrinsic speaker or broadcasting system. An integral speaker may also be coupled to the housing 12 and communicatively coupled to the processor 18. A microphone input port 66 may also be coupled to the housing 12 and communicatively coupled to the processor 18 for selectively inputting audio to the processor 18 for transmission through the integral speaker, an extrinsic speaker through the audio output port 64, or for recording to a memory mechanism.

In use, the post 20 is selectively extended and retracted to a desired position to adjust the viewable portion of the monitor screen 30. The key panel 54 is used to control the assembly for use as a conventional computer, television or the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

I claim:

1. A retractable monitor computer assembly comprising:
    a housing having a bottom configured for supporting said housing on a surface;
    a processor coupled to and positioned in said housing;
    a pair of rollers, said rollers being positioned in parallel spaced alignment, each said roller having an upper end and a lower end;
    an upper arm coupled to and extending between said upper ends of said spaced rollers;
    a lower arm coupled to and extending between said lower ends of said spaced rollers, each of said upper arm and said lower arm being telescopic wherein a distance between said rollers is adjustable;
    a monitor screen operationally coupled to said processor, said monitor screen having opposed lateral sides, each said opposed lateral side being coupled to an associated one of said rollers, said monitor screen being flexible wherein said monitor screen is rolled onto said rollers when said upper arm and said lower arm are each in a fully retracted position, said monitor screen being in a planar position when said upper arm and said lower arm are each in a fully extended position;
    said housing having a substantially trapezoidal cross-sectional shape transverse to said lower arm, said housing having a substantially trapezoidal cross-sectional shape parallel to said lower arm wherein said bottom of said housing has a greater area than a top of said housing; and said lower arm and said upper arm being substantially centered over said housing when in said fully retracted position.

2. The assembly of claim 1, further comprising a support coupled to and positioned in said housing, said upper arm, said lower arm, said rollers, and said monitor screen defining a screen assembly, said screen assembly being coupled to said support, said support being adjustable between a raised position and a lowered position wherein said screen assembly is selectively extendable from and retractable into said housing while said upper arm and said lower arm are each in said fully retracted position.

3. The assembly of claim 1, further comprising a key panel coupled to and positioned on a front face of said housing, said key panel being operationally coupled to said processor.

4. The assembly of claim 1, further comprising a power port coupled to said housing, said power port being electrically coupled to said processor and said monitor screen.

5. The assembly of claim 1, further comprising a communication port coupled to said housing, said communication port being communicatively coupled to said processor.

6. The assembly of claim 1, further comprising a video output port coupled to said housing, said video output port being communicatively coupled to said processor for outputting a video signal through said video output port.

7. The assembly of claim 1, further comprising an audio output port coupled to said housing, said audio output port being communicatively coupled to said processor for outputting an audio signal through said audio output port.

8. The assembly of claim 1, further comprising a microphone input port coupled to said housing, said microphone input port being communicatively coupled to said processor for inputting audio to said processor.

9. A retractable monitor computer assembly comprising:
    a housing having a bottom configured for supporting said housing on a surface;
    a processor coupled to and positioned in said housing;
    a pair of rollers, said rollers being positioned in parallel spaced alignment, each said roller having an upper end and a lower end;
    an upper arm coupled to and extending between said upper ends of said spaced rollers;
    a lower arm coupled to and extending between said lower ends of said spaced rollers, each of said upper arm and said lower arm being telescopic wherein a distance between said rollers is adjustable, said housing having a substantially trapezoidal cross-sectional shape transverse to said lower arm, said housing having a substantially trapezoidal cross-sectional shape parallel to said lower arm wherein said bottom of said housing has a greater area than a top of said housing;
    a monitor screen operationally coupled to said processor, said monitor screen having opposed lateral sides, each said opposed lateral side being coupled to an associated one of said rollers, said monitor screen being flexible wherein said monitor screen is rolled onto said rollers when said upper arm and said lower arm are each in a fully retracted position, said lower arm and said upper arm being substantially centered over said housing when in said fully retracted position, said monitor screen being in a planar position when said upper arm and said lower arm are each in a fully extended position, said monitor screen being substantially centered over said housing when said upper arm and said lower arm are in said fully extended position;
    a support coupled to and positioned in said housing, said upper arm, said lower arm, said rollers, and said monitor screen defining a screen assembly, said screen assembly being coupled to said support, said support being adjustable between a raised position and a lowered position wherein said screen assembly is selectively extendable from and retractable into said housing while said upper arm and said lower arm are each in said fully retracted position;

a key panel coupled to and positioned on a front face of said housing, said key panel being operationally coupled to said processor;

a power port coupled to said housing, said power port being electrically coupled to said processor and said monitor screen;

a communication port coupled to said housing, said communication port being communicatively coupled to said processor;

a video output port coupled to said housing, said video output port being communicatively coupled to said processor for outputting a video signal through said video output port;

an audio output port coupled to said housing, said audio output port being communicatively coupled to said processor for outputting an audio signal through said audio output port; and a microphone input port coupled to said housing, said microphone input port being communicatively coupled to said processor for inputting audio to said processor.

* * * * *